July 21, 1964
C. C. MINTER
3,142,016
RATIO-MEASURING APPARATUS UTILIZING A CAPACITANCE BRIDGE CIRCUIT
Filed Dec. 18, 1961
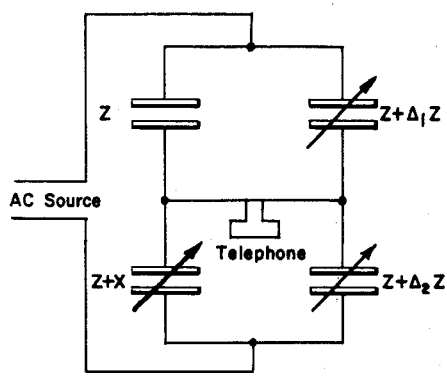
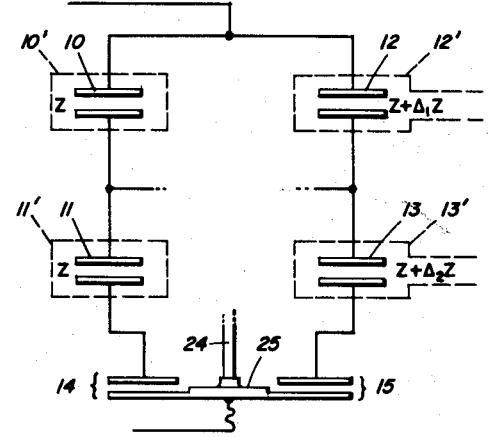
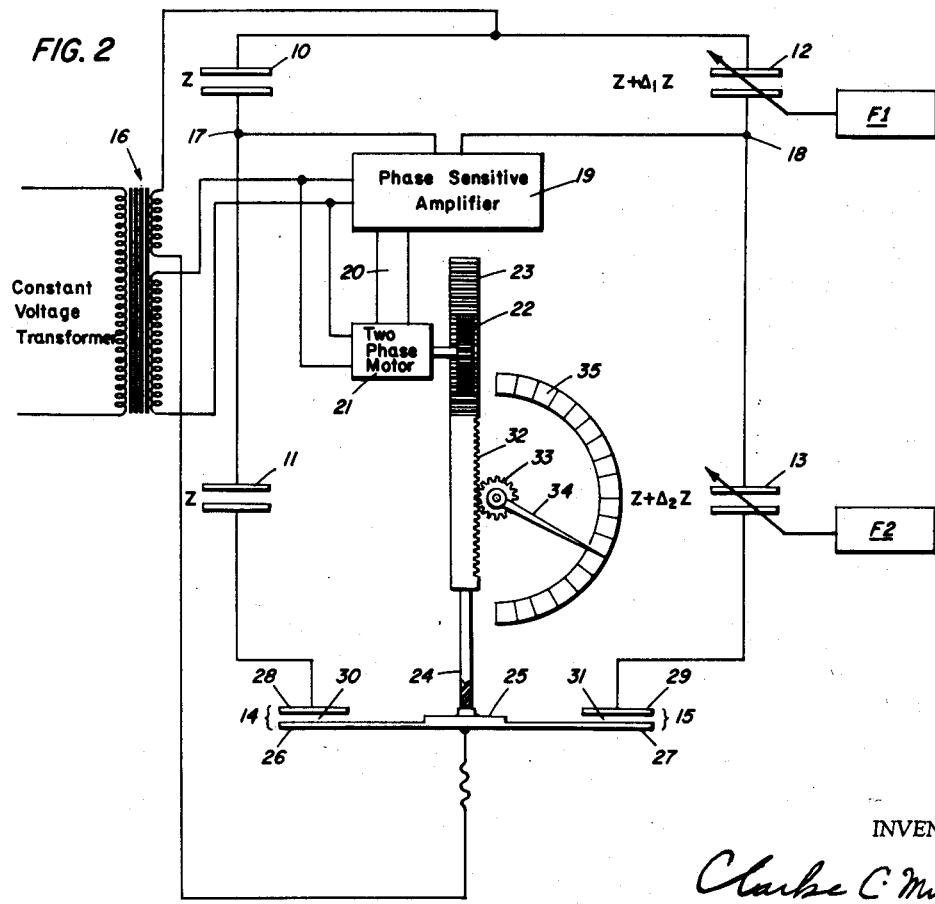
INVENTOR
Clarke C. Minter

United States Patent Office 3,142,016
Patented July 21, 1964

3,142,016
RATIO-MEASURING APPARATUS UTILIZING A CAPACITANCE BRIDGE CIRCUIT
Clarke C. Minter, 3136 Dumbarton Ave. NW.,
Washington 7, D.C.
Filed Dec. 18, 1961, Ser. No. 160,044
2 Claims. (Cl. 324—61)

This invention relates to electrical apparatus in general and describes a novel capacitance bridge for measuring the ratio of the *changes* in capacitance of two similar gas-filled capacitors in the bridge.

In my prior Patent 3,021,495 entitled "Ratio-Measuring Circuit" I described a novel resistance bridge circuit for indicating the ratio of the *changes* in resistance of two independently variable resistances in the bridge. Since the changes in resistance are produced by moving a sliding contact over two resistances in the bridge it is readily seen that the ratio of the two forces actuating the sliding contacts can be related to the ratio of the changes in resistance of the two variable resistances. Because of variable mechanical friction between the movable contacts and the resistors in the circuit of my Patent 3,021,495 errors could arise in the measurement of the ratios, and in order to eliminate this source of error entirely I have invented an improved ratio-measuring circuit in which the fixed and variable impedances are gas-filled capacitors connected in the form of a bridge circuit.

Capacitance bridges are well known in the art and are widely used for the measurement of capacitance and/or specific inductive capacity of dielectrics. The conventional capacitance bridge used for such measurements is a four-arm bridge containing fixed and variable capacitors and resistors and will give accurate results when the unknown capacitances are compared with variable standard capacitances, and when the dielectrics are liquid or solid. Owing to power losses in solid and liquid dielectrics it is necessary to obtain a resistance balance as well as a reactance balance in conventional capacitance bridges, which must also contain variable resistances in two or more arms. The present invention contemplates a capacitance bridge in which reactance-free resistances could be employed in securing a balance, but preferably all four arms would contain only capacitors in which there is no dielectric power loss. This means that fixed and variable capacitors in the bridge must be either vacuum-filled or gas-filled, and in most cases simple air capacitors are employed.

It is well known from electrical theory that the capacitance of a gas-filled parallel-plate capacitor depends on several factors as expressed in the formula $$C = \frac{kA}{4\pi d} \quad (1)$$

in which C is capacitance, $k$ is dielectric constant, A is area of the plates and $d$ is the thickness of the dielectric between the plates. If the distance $d$ between the plates is constant it can be seen from the formula that capacitance can be varied either by varying the dielectric constant $k$ or by varying the area A of the plates. If $k$ is held constant the capacitance can be changed by varying the area A of the plates, or if A is fixed the capacitance will depend on the nature of the gas between the plates. On the other hand, for an air capacitor of fixed area the capacitance can be changed only by varying the distance $d$ between the parallel plates, since $k$ and A are constant. This invention contemplates varying $k$, A, and $d$ in Formula 1 either singly or two at a time, depending on the type of measurement being carried out in the bridge.

For example, if A is constant the small changes in capacitance produced by varying the composition of a mixture of gases can be accurately measured by means of this invention. On the other hand, if $k$ and $d$ are constant while A is varied by any means whatever, a quantitative relation between the magnitude of the means and the change in capacitance can be established. If the area A of two capacitors in the circuit can be varied simultaneously in proportion to two independent means, this invention makes it possible to obtain an indication of the *ratio* of the magnitudes of the two independent means.

The primary object of this invention, therefore, is to provide a capacitance bridge for accurately measuring the ratio of the magnitudes of the changes in capacitance of two capacitors in the bridge circuit whether produced by two independent external forces acting to vary the area A of two gas filled capacitors, or by varying the dielectric constant of the gases in two of the fixed-area gas-filled capacitors.

Another object of this invention is to provide a capacitance bridge capable of accurately measuring the small differences in capacitance produced in a gas-filled capacitor by varying the nature of the gas, vapor, or mixture of gases and/or vapors.

Other objects and advantages of the present invention will become apparent by consideration of the following description and the accompanying drawings.

FIG. 1 is not a part of this invention but shows diagrammatically a conventional bridge containing four similar air capacitors, three of which are variable, and is submitted in connection with discussion of the principles employed in the present invention.

FIG. 2 is a schematic representation of one embodiment of this invention for indicating the ratio of the changes in capacitance produced in two capacitors by the action of two independently variable external means.

FIG. 3 is another form of this invention employed for measuring the dielectric constants of gases and vapors, or for the analysis of gaseous mixtures.

Referring to FIG. 1, there is shown a bridge which is balanced if the four air capacitors have the same impedance equal to Z when the three variable capacitors are in zero position (minimum impedance). If the area of one variable capacitor on the right is decreased so that its impedance increases by an amount $\Delta_1 Z$, and the impedance of the other variable capacitor in the same branch is increased by an amount $\Delta_2 Z$ ($\Delta_2 Z > \Delta_1 Z$) the bridge will become unbalanced. However, the bridge can again be balanced by increasing the impedance of the variable capacitance in the other branch by an amount X. When the bridge is once again balanced we have $$\frac{Z + \Delta_1 Z}{Z + \Delta_2 Z} = \frac{Z}{Z + X} \quad (2)$$

which reduces to $$\frac{\Delta_2 Z}{\Delta_1 Z} = 1 + \frac{X}{\Delta_1 Z} \frac{(Z + \Delta_1 Z)}{Z} \quad (3)$$

Equation 2 shows the ratio of the total impedance of any two arms of the bridge, but as can be seen from Equation 3 the ratio of the impedance increments $\Delta_2 Z / \Delta_1 Z$ can not be obtained in a simple manner with the conventional bridge of FIG. 1.

In FIG. 2, 10 and 11 are two similar fixed parallel-plate air capacitors, 12 and 13 are similar variable air capacitors in which the distance between the plates is constant while the area of the plates is variable. 14 and 15 are two similar variable air capacitors in which the distance between plates of constant area can be varied. Connected as shown in FIG. 2, the network of air capacitors forms a capacitance bridge which is energized by a suitable low-frequency (60–400 cycles/sec.) A.C. voltage supplied by constant voltage transformer 16. F1 and F2 are two independent means of any nature whatever for varying the area of the parallel plates in variable capacitors 12 and 13 respectively.

Connected to points 17 and 18 in the bridge are the input terminals of phase-sensitive amplifier 19 which is also energized by a suitable voltage from constant voltage transformer 16. Output leads from the phase sensitive amplifier are connected to one winding of 2-phase motor 21, the other winding of which is also connected to constant voltage transformer 16. Positioned on the shaft of motor 21 is gear 22 which meshes with rack 23 fastened to one end of a movable non-conducting rod 24 to the other end of which is fastened a rigid conductor 25 supporting on opposite sides and making contact with two similar capacitor plates 26 and 27. 28 and 29 are two fixed capacitor plates parallel to and having essentially the same area as movable plates 26 and 27. 30 and 31 are equal gaps between the plates of capacitors 14 and 15, both having the same impedance X at all positions of plates 26 and 27. When gaps 30 and 31 are zero and electrical contact is made between plates 26 and 28 and between plates 27 and 29, capacitors 14 and 15 will have zero impedance, a condition which exists when capacitors 10, 11, 12 and 13 all have the same impedance; that is, when the impedance increments $\Delta_1 Z$ and $\Delta_2 Z$ of 12 and 13 are zero. When $\Delta_1 Z$ and $\Delta_2 Z$ are not zero ($\Delta_2 Z > \Delta_1 Z$) the impedance of 12 and 13 becomes greater than Z and the bridge becomes unbalanced, not only as regards the potential difference at points 17 and 18, but also because the currents at the two points are out of phase. Phase-sensitive amplifier 19 now operates motor 21 which moves rod 24 to form capacitors 14 and 15, thereby adding impedance X to both sides of the bridge in order to restore the balance of phase and potential at points 17 and 18.

Attached to rod 24 is rack 32 which meshes with pinion 33 to move pointer 34 over a suitably calibrated scale 35. Assuming that F1 and F2 have unbalanced the bridge by adding increment $\Delta_1 Z$ to impedance Z in capacitor 12 and increment $\Delta_2 Z$ to impedance Z in capacitor 13, and that balance has been restored by adding impedance X to both sides of the bridge in capacitors 14 and 15, it is now possible to obtain a simple indication of the ratio of the impedance increments $\Delta_2 Z / \Delta_1 Z$.

From elementary bridge theory we know that at balance $$\frac{Z}{Z + \Delta_1 Z} = \frac{Z + X}{Z + \Delta_2 Z + X} \qquad (4)$$

When reduced Equation 4 becomes $$\frac{\Delta_2 Z}{\Delta_1 Z} = \frac{Z + X}{Z} \qquad (5)$$

By comparing Equation 5 with Equation 3 it can be seen that FIG. 2 will give a simple indication of the ratio $\Delta_2 Z / \Delta_1 Z$ whereas the conventional bridge in FIG. 1 gives a value for the ratio that cannot be indicated. It should therefore be clear that the bridge illustrated in FIG. 2 is a great improvement over that in FIG. 1. In order to make clear just how this invention can be used to make many different types of measurements, the discussion below takes up the electrical principles involved.

It is well known from electrical theory that impedance at a given frequency is inversely proportional to capacitance, so that for a parallel-plate air capacitor we can write $Z = M/C$, where M is a constant. Substituting Equation 1 for C we obtain $$Z = \frac{M 4\pi d}{kA} = \text{constant } xd/A \qquad (6)$$

If $d$ is constant, the impedance of a parallel-plate air capacitor is inversely proportional to A, so when the area of capacitors 12 and 13 is diminished by the action of forces F1 and F2 the impedance of 12 increases to $Z + \Delta_1 Z$ while the impedance of 13 increases to $Z + \Delta_2 Z$ ($\Delta_2 Z > \Delta_1 Z$). On the other hand, if the area of a parallel-plate air capacitor remains constant, while the distance $d$ between the plates is varied it can be seen from Equation 6 that the impedance of such a capacitor is directly proportional to the distance between the plates. This principle is employed in capacitors 14 and 15 which are ganged in such a manner that when plates 26 and 27 are moved a distance $d$ from plates 28 and 29, the same impedance X is added to both sides of the bridge, thereby restoring the bridge to balance and giving an indication of the ratio of impedance increments $\Delta_2 Z / \Delta_1 Z$.

It is obvious that instead of restoring the balance of the bridge by adding to both sides an impedance X in the form of capacitance the same result can be obtained by adding to each side of the bridge an impedance X in the form of a reactance-free resistance of suitable value, which could be in the form shown in FIG. 2 of my pending application Serial No. 82,078, now U.S. Patent 3,021,495.

It can be shown by calculus that if the decreases in area of capacitances 12 and 13 are directly proportional to forces F1 and F2 the increases in impedance $\Delta_1 Z$ and $\Delta_2 Z$ of capacitors 12 and 13 will be equal to F1 and F2 multiplied by a constant. From Equation 6 it is seen that the product of impedance and area is constant—that is $ZA =$ constant. If the area diminishes by a small increment $\Delta A$ the impedance will increase by the small increment $\Delta Z$, and we have $(Z + \Delta Z)(A - \Delta A) = AZ$, from which after neglecting the product of the two small increments $(\Delta Z)(\Delta A)$, we obtain $A \Delta Z - Z \Delta A = 0$. If $\Delta A$ is directly proportional to F then $\Delta A = BF$, where B is a constant of proportionality. Substituting for $\Delta A$, the result is $A \Delta Z - ZBF = 0$, or $$\Delta Z = \frac{ZBF}{A} = \text{constant } xF$$

From the above discussion, it is clear that a linear scale can be used to indicate the ratio $F2/F1$ of the two forces used to increase the impedances of capacitors 12 and 13.

FIG. 3 shows the essential elements of the capacitance bridge in FIG. 2, but the power supply and the servo-system for automatically balancing the bridge have been omitted. In the bridge of FIG. 3, capacitors 10 and 11 are shown mounted in gas-tight enclosures 10' and 11' so that they can either be evacuated or sealed with a given gas. Similarly, capacitors 12 and 13 are mounted in gas-tight enclosures 12' and 13'.

While area and distance between plates are fixed, capacitors 12 and 13 of FIG. 3 are variable and according to Equation 6 when A and $d$ are fixed, the only way to vary the impedance of the capacitor is to vary the value of the dielectric constant $k$ of the gas between the plates. For this reason, vessels 12' and 13' have suitable fittings for connecting to conduits so that a gas, a vapor, or a mixture of gases and/or vapors can be introduced or circulated between the plates of capacitors 12 and 13 as desired. This embodiment can be employed for determining the ratio of the dielectric constants of two gases or vapors, or for the analysis of mixtures of gases or vapors. For example, if capacitor 12 is in air and capacitor 13 is in a mixture of air and another gas having a higher dielectric constant, it is possible to obtain an indication of the unknown concentration of the second gas in air. Another example is the indication of the relative humidity of the atmosphere which can be obtained by putting dry air in containers 10' and 11' and moist air in container 12' while container 13' contains air saturated at the same temperature.

It is also possible to indicate the ratio of two pressures with the embodiment of FIG. 3 simply by applying a gas under pressure to container 12' while the same gas under a higher pressure is applied to container 13'.

In all applications contemplated in FIG. 3, the value of the dielectric constant $k$ of the gases or vapors used in capacitors 12 and 13 would be greater than the value of $k$ for the dielectric in capacitors 10 and 11. Hence, according to Equation 6 the impedance of capacitors 12 and 13 will be less than that of capacitors 10 and 11. However, the bridge can be balanced by addition of impedance X to both sides just as in the case of FIG. 2, in which the impedance increases. For FIG. 3 we have at balance $$\frac{Z}{Z-\Delta_1 Z} = \frac{Z+X}{Z-\Delta_2 Z+X} \qquad (7)$$

from which $$\frac{\Delta_2 Z}{\Delta_1 Z} = \frac{Z+X}{Z} \qquad (8)$$

It can be seen that Equations 8 and 5 are the same, which means that the ratio of the changes in impedance can be indicated correctly whether $\Delta_1 Z$ and $\Delta_2 Z$ are positive or negative.

It can also be seen from Equations 5 and 8 that when $X=0$ the ratio $\Delta_2 Z/\Delta_1 Z=1.00$. In this case, plates 26 and 28 of capacitor 14 and plates 27 and 29 of capacitor 15 make contact to complete the circuit connecting the bridge to the constant voltage transformer 16. It is also clear that when $X=Z$, the ratio $\Delta_2 Z/\Delta_1 Z=2.00$. In order to indicate ratios greater than 2.00 it will be necessary for X to be greater than Z, which in some cases might require a rather large air capacitor. In such cases, a fixed impedance can be added between capacitors 11 and 14 and an equal impedance between capacitors 13 and 15 to measure ratios lying between two values such as 2 and 3, etc. In most cases $\Delta_2 Z/\Delta_1 Z$ will lie between rather narrow limits. However, it is possible to indicate ratios varying between wide limits by inserting the necessary similar fixed impedances in the form of reactance-free resistances between capacitors 11 and 14 and between capacitors 13 and 15.

While this invention has been illustrated above in limited embodiments it is understood that modifications and variations may be made without departing from the spirit and scope of the invention as defined by the appended claims.

What is claimed is:

1. Improved ratio-measuring circuit for measuring the ratio of the magnitudes of two independently variable forces comprising two similar parallel combinations of air capacitors having negligible dielectric loss, one combination consisting of two series-connected similar fixed area reference air capacitors in series with a constant-area variable-distance parallel-plate air capacitor, the other combination consisting of two series-connected similar variable-area air capacitors which can be reduced in area in proportion to the magnitudes of the independently variable external forces from a maximum equal to that of the fixed area reference air capacitors, in series with a constant-area variable-distance parallel-plate air capacitor, automatic bridge-balancing means connected to a point between the fixed area air capacitors and to a point between the variable-area air capacitors for simultaneously moving a pointer over a scale calibrated in terms of the ratio of said independently variable external forces while varying the distance between the plates of said distance-variable parallel-plate air capacitors in order to reduce to zero any difference in phase or potential caused to exist at the terminals of said bridge-balancing means by unequal changes in capacitance produced in said variable-area air capacitors by the independently variable external forces, and a suitable power supply for energizing the bridge circuit.

2. Improved ratio-measuring circuit for measuring the ratio of the dielectric constants of two gases, vapors or mixtures of gases and/or vapors comprising two similar parallel combinations of capacitors having negligible dielectric loss, one combination consisting of a pair of series-connected similar fixed evacuated reference capacitors in series with a constant-area variable-distance parallel-plate air capacitor, the other combination consisting of a similar pair of fixed capacitors mounted in separate gas-tight envelopes having suitable fittings for connecting to conduits for carrying a gas, a vapor or a mixture of gases and/or vapors, in series with a constant-area variable-distance parallel-plate air capacitor, automatic bridge-balancing means connected to a point between the two series-connected evacuated reference capacitors and to a point between the two series-connected gas-filled capacitors for simultaneously moving a pointer over a suitably calibrated scale while varying the distance between the plates of said distance-variable parallel-plate air capacitors in order to reduce to zero any difference in phase or potential caused to exist at the terminals of said bridge-balancing means by differences in the dielectric constants of said gases, vapors or mixtures of gases and/or vapors in the gas-filled capacitors, and a suitable power supply for energizing the bridge circuit.

References Cited in the file of this patent

UNITED STATES PATENTS

| | | |
|---|---|---|
| 2,371,395 | Keeling | Mar. 13, 1945 |
| 2,639,411 | Schafer | May 19, 1953 |
| 2,711,510 | Tricebock | June 21, 1955 |
| 2,968,180 | Schafer | Jan. 17, 1961 |
| 3,010,319 | Sontheimer | Nov. 28, 1961 |
| 3,021,495 | Minter | Feb. 13, 1962 |
| 3,039,050 | Krohn | June 12, 1962 |
| 3,085,194 | Revesz | Apr. 9, 1963 |